United States Patent
Momose et al.

(10) Patent No.: US 9,267,827 B2
(45) Date of Patent: Feb. 23, 2016

(54) ELECTROMAGNETIC FLOW METER EXCITATION CIRCUIT AND ELECTROMAGNETIC FLOW METER

(71) Applicant: Azbil Corporation, Tokyo (JP)

(72) Inventors: Osamu Momose, Tokyo (JP); Hideo Sawada, Tokyo (JP); Ichiro Mitsutake, Tokyo (JP); Yoshio Yamazaki, Tokyo (JP)

(73) Assignee: AZBIL CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/385,029

(22) PCT Filed: Mar. 15, 2013

(86) PCT No.: PCT/JP2013/057436
§ 371 (c)(1),
(2) Date: Sep. 12, 2014

(87) PCT Pub. No.: WO2013/137445
PCT Pub. Date: Sep. 19, 2013

(65) Prior Publication Data
US 2015/0040682 A1    Feb. 12, 2015

(30) Foreign Application Priority Data
Mar. 15, 2012    (JP) ................. 2012-059040

(51) Int. Cl.
*G01F 1/60* (2006.01)
*G01F 1/58* (2006.01)

(52) U.S. Cl.
CPC . *G01F 1/60* (2013.01); *G01F 1/588* (2013.01)

(58) Field of Classification Search
None
See application file for complete search history.

(56) References Cited

U.S. PATENT DOCUMENTS

2005/0021248 A1    1/2005    Mitsutake
2014/0247532 A1*    9/2014    Momose ............... G01F 1/60
                                                                361/154

FOREIGN PATENT DOCUMENTS

| JP | H02-122221 | 5/1990 |
| JP | H02-143121 | 6/1990 |
| JP | 2004-061451 | 2/2004 |
| JP | 4004931 | 11/2007 |

OTHER PUBLICATIONS

International Search Report dated Jun. 6, 2013, which issued during prosecution of International Application No. PCT/JP2013/057436.

* cited by examiner

*Primary Examiner* — Harshad R Patel
(74) *Attorney, Agent, or Firm* — Troutman Sanders LLP

(57) ABSTRACT

An excitation circuit, which is used in an electromagnetic flow meter, measures a flow rate value for a fluid, based on an electromotive force. An excitation coil, which is provided on an outside of a measurement tube, is supplied with an excitation current, where, in response, the electromotive force, which is perpendicular to a magnetic field of the excitation coil that is generated in the fluid within the measurement tube, is detected by a pair of electrodes provided on the measurement tube.

3 Claims, 7 Drawing Sheets

Background Art

ELECTROMAGNETIC FLOW METER EXCITATION CIRCUIT AND ELECTROMAGNETIC FLOW METER

CROSS-REFERENCE TO RELATED APPLICATIONS

This is a U.S. national phase application under 35 U.S.C. §371 of International Patent Application No. PCT/JP2013/057436, filed on Mar. 15, 2013, and claims benefit of priority to Japanese Patent Application No. JP 2012-059040, filed on Mar. 15, 2012. The International Application was published on Sep. 19, 2013, as International Publication No. WO 2013/137445 under PCT Article 21(2). The entire contents of these applications are hereby incorporated by reference.

FIELD OF TECHNOLOGY

The present invention relates to an excitation circuit for an electromagnetic flow meter, and to an electromagnetic flow meter provided therewith, for measuring a flow rate of a fluid that is electrically conductive in a variety of processing systems.

BACKGROUND

Typically, in electromagnetic flow meters for measuring the flow rate of a fluid that is electrically conductive, the flow rate of the fluid that flows within a measurement pipe is measured by providing a magnetic excitation electric current that alternatingly switches polarities to a magnetic excitation coil that is disposed so that the direction of the magnetic field that is produced is perpendicular to the direction of flow of the fluid that is flowing within the measurement pipe, to detect the electromotive force that is produced between a pair of electrodes that are disposed within the measurement pipe perpendicular to the magnetic field produced by the magnetic excitation coil, and sampling and performing signal processing after amplifying the electromotive force that is produced between the electrodes.

As illustrated in FIG. 5, this electromagnetic flow meter 50 is structured from a detector 50A and a converter 50B.

The detector 50A is provided with a measurement tube 51, electrodes 52, and excitation coils 53, as the primary structures thereof.

The measurement tube 51, as a whole, is made from a cylinder of a non-magnetic metal, such as stainless steel, and, on the inside thereof, has a flow path 51F for the fluid that is subject to measurement.

The excitation coil 53 are made from a pair of coils that are disposed facing the outsides of the measurement tube 51, and have a function for generating a magnetic field B, in a direction that is perpendicular to the direction of flow of the fluid that is flowing within the flow path 51F, in accordance with an excitation current Iex that is supplied from a converter 50B.

The electrodes 52 comprise a pair of electrodes that are disposed so as to contact the fluid that is flowing within the flow path 51F, on the inner wall of the measurement tube 51, facing a direction that is perpendicular to the direction of the magnetic field B that is produced by the excitation coil 53, and have a function for detecting, and outputting to the converter 50B, an electromotive force E that is produced within the fluid in accordance with the excitation of the fluid by the magnetic field B.

The converter 50B has, as its primary circuit portions, a communication interface portion 55, a signal processing portion 56, and an excitation circuit 57.

The communication interface portion 55 is connected to a higher-level device (not shown), such as a controller, through a signal line W, and has a function for generating an operating power supply from the electric power that is supplied through the signal line W from the higher-level device to supply the various functional portions, and a function for sending, to the higher-level device through the signal line W through data communication, a flow rate value for the fluid, obtained from the signal processing portion 56.

The signal processing portion 56 has a function for generating, and outputting to the excitation circuit 60, an excitation signal comprising pulse signals that have a specific excitation frequency, a function for calculating a fluid flow rate through sampling and performing signal processing based on the signal amplification and the excitation frequency, of the electromotive force E detected by the electrodes 52, and a function for outputting, to the communication interface portion 55, the flow rate value thus obtained.

The excitation circuit 60 has a function for generating, and providing to the excitation coil 53, a square wave AC excitation current for switching and controlling the excitation polarity, based on the excitation signal from the signal processing portion 56.

In this type of electromagnetic flow meter 50, a variety of noises, including electro-chemical noises, fluid noises, slurry noises, and the like, are superimposed onto the electromotive force detected by the electrodes 52. Consequently, in order to calculate the flow rate value accurately from the electromotive force, it is necessary to reduce these noises. Here these noises have the so-called "1/f" characteristic of being greater the lower the frequency band. Because of this, the higher the excitation frequency, the better the S/N ratio, and thus the more precisely the value for the flow rate can be calculated.

On the other hand, when an AC excitation current, such as comprising a square wave, in this way, is applied to the excitation coil 53, the effect of the self-inductance inherent to the excitation coil will cause the rising edge of the excitation current to be less steep, and will produce a delay in the waveform. Consequently, because the wavelength of the excitation signal is shortened when the excitation frequency is increased, the proportion of the delay in the rising edge in relation to the wavelength is increased, shortening the period of time over which an adequate magnetic field is generated, and shortening also the average steady-state region for the amplitude in the electromagnetic force that is detected by the electrode. As a result, sampling of a stable electromagnetic force becomes difficult, resulting in an increase in the error in the value of the flow rate. Because of this, it is necessary for the ramping of the excitation current to be slow, even if the excitation frequency is high.

Conventionally, there has been a proposal for a technology for improving the rising edge of the excitation current when switching the excitation polarity, through charging, into a capacitive element, the reverse induced voltage that is produced by the excitation coil, and then reusing that as electric power for excitation. See, for example, Japanese Unexamined Patent Application Publication No. H2-12221 and Japanese Patent No. 4004931).

As illustrated in FIG. 6, this type of excitation circuit 60 is structured from a switching circuit 61, a constant current circuit 62, a diode D60, a diode bridge DB, and a capacitive element C.

The constant current circuit 62 is a typical constant current circuit such as structured from an emitter-follower circuit made from, for example, a transistor Q, an op-amp OP, and a resistive element R, connected between the current output terminal Tout from the switching circuit 61 and the ground electropotential GND, where the driving current is supplied at a constant current from a power supply voltage VP to the switching circuit 61 based on a setting voltage Vcnt.

The switching circuit 61 has a function for generating, and supplying to an excitation coil L, an AC excitation current Iex through controlling polarity switching of the constant current that is supplied to the current input Tin from the power supply voltage VP by the constant current circuit 62, based on the excitation signals SA and SB, which comprise pulse signals that have mutually complementary phase relationships, outputted from a signal processing portion (not shown) of the converter.

The diode bridge DB has a function for rectifying the reverse induced voltage that is produced across (on both ends of) the terminals L1-L2 of the excitation coil L, to charge the capacitive element C. The AC terminals of the DB are connected, respectively, to L1 and L2, where the plus terminal is connected to one end of the capacitive element C, and the minus terminal is connected to the ground electropotential GND. The use of a Schottky diode structure in this DB can reduce the voltage drop in the forward direction in the individual diodes that structure the DB.

The capacitive element C is connected between the current input terminal Tin and the ground electropotential GND, and has a function for charging the reverse induced voltage that has been rectified by the DB.

The diode D60 is connected in series with the power supply voltage VP and the current input terminal Tin, and has a function for preventing back-flow, to the power supply voltage VP side, the charging voltage VC that is charged into the capacitive element C.

This switching circuit 61 is provided with four switching circuits SW 61 through SW 64 for turning the current ON/OFF, and of these, the circuit wherein SW 61 and SW 63 are connected in series and the circuit wherein SW 62 and SW 64 are connected in series are connected in parallel with each other. The terminal L1 of the excitation coil L is connected to the connection node between the contact terminal of SW 61 and the contact terminal of SW 63, and, similarly, the terminal L2 is connected to the contact node between the contact terminal of SW 62 and the contact terminal of SW 64.

As illustrated in the signal waveform diagram in FIG. 7, the excitation signals SA and SB are pulse signals, of the excitation frequency, that have a mutually complementary phase relationship, where, of these, SA controls SW 61 and SW 64, and SB controls SW 62 and SW 63.

Consequently, as shown at time T60, when there is a rising edge of SA and a falling edge of SB, SW 61 and SW 64 turn ON, and SW 62 and SW 63 turn OFF. As a result, a path is formed, as the path for the driving current that is inputted through D60 and Tin from VP, through SW 61→terminal L2→excitation coil L→terminal L1→SW 64→Tout→constant current circuit 62, to perform the polarity switching of the excitation current Iex.

On the other hand, as shown at Time T61, at the rising edge of SB and the falling edge of SA, SW 61 and SW 64 are turned OFF and SW 62 and SW 63 are turned ON. Because of this, a path is formed, as the path for the driving current, through SW 62→terminal L1→excitation coil L→terminal L2→SW 63→Tout→constant current circuit 62, to perform polarity switching of the excitation current Iex.

Here, when the polarity of the excitation current Iex is switched, the self-inductance of the excitation coil L produces a reverse induced voltage at the across-terminal voltage VL, across the ends L1-L2 of the excitation coil L. For example, at time T60, when the excitation current Iex is switched from the L1→L2 direction where it has been until this point, to the L2→L1 direction, the reverse induced voltage that is produced between the two ends L1-L2 of the excitation coil L causes the voltage at L2 to be higher than the voltage at L1. At this time, L1 is connected through SW 64 and through the constant current circuit 62 to the ground electropotential GND, and thus the high voltage generated at L2 is charged through the DB into the capacitive element C.

On the other hand, at time T61, when the excitation current Iex is switched from the L2→L1 direction where it has been until this point, to the L1→L2 direction, the reverse induced voltage that is produced between the two ends of the excitation coil L causes the voltage at L1 to be higher than the voltage at L2. At this time, L2 is connected through SW 63 and through the constant current circuit 62 to the ground electropotential GND, and thus the voltage generated at L1 is charged through the DB into the capacitive element C.

In this way, the reverse induced voltage that is generated in the excitation coil L at the time of polarity switching of the excitation current Iex is charged into the capacitive element C, and thus, during the time interval over which the charging voltage VC of the capacitive element C is higher than the voltage that is supplied from the power supply voltage VP through the diode D60, a current is supplied to the switching circuit 61 from the capacitive element C. This enables the provision of greater electric power to the Tin of the switching circuit 61, reducing the delay time from the timing of the switching of the excitation signals SA and SB until the excitation current Iex arrives at the maximum value. As a result, this makes it possible to cause the rising (or falling) of the excitation current Iex, even when at a high excitation frequency, to be faster than when compared to the case wherein the reverse induced voltage of the excitation coil L is not used (the waveform indicated by the dotted line in FIG. 7).

In this type of conventional technology, a high voltage difference is produced, through the reverse induced voltage of the excitation coil L, between the contact terminal sides of the switching circuits SW 61 through SW 64 and the control terminal side into which the excitation signals SA and SB are inputted. As explained using FIG. 6 and FIG. 7, above, a high reverse induced voltage is produced between the terminals L1 and L2 when the polarity of the excitation current Iex is switched, so the peak value of the charging voltage VC for the capacitive element C goes higher than the power supply voltage VP. For example, if the power supply voltage VP is 10 V, in some cases the charging voltage VC may increase to as much as 100 V through the reverse induced voltage within the excitation coil L.

Typically, the contact terminals to which the high voltage is applied for SW 63 and SW 64 are drain terminals of MOSFETs (N-channel), so the MOSFETs will not be damaged even if not of the high-voltage type. However, in the switches SW 61 and SW 63, typically the contact terminals to which the high voltages are applied, through the current input terminal Tin of the capacitive voltage C, are source terminals of MOSFETs (P-channel), so there is a problem in that SW 61 and SW 62 become damaged.

One strategy for avoiding damaging SW 61 through SW 64 through the high-voltage in this way is a method wherein guarding measures, such as limiting the peak value of the charging voltage VC are taken. In this method, the voltage that is charged into the capacitive element C is reduced, and thus there is a problem in that the reverse induced voltage of the excitation coil L is not used effectively as electric power for driving the excitation coil.

Moreover, as another method by which to prevent damage to SW 61 and SW 62 through the high-voltage in this way, one may consider the use of a high-voltage switching circuit made from a MOSFET that has adequate voltage durability performance, that is, from a high-voltage MOSFET, so as to not cause damage even if the reverse induced voltage of the excitation coil L is applied to these switches SW 61 and SW 62. As an example, while the absolute maximum rating (VDS) for the drain-source voltage in a normal MOSFET is about 20 V, in a high-voltage MOSFET, the VDS is about 100 V, or even greater than 100 V.

However, high-voltage MOSFETs tend to have higher resistance, where the excitation current Iex is produced by this resistance, and, as a result, there is a problem in that the excitation coil cannot be driven efficiently by the power supply voltage VP.

Moreover, as described above, the voltage on the contact terminal side, which is that which is turned ON and OFF by the MOSFET that structures the switching current, varies greatly, from the 10 V that is the power supply voltage VP to 100 V, which is the peak value of the charging voltage VC.

On the other hand, when a high-voltage is turned ON or OFF in a high-voltage MOSFET, a high-voltage must be applied to the gate terminal in combination with this voltage. Because of this, in order to control a voltage that has a broad scope of variability, the voltage at the gate terminal side must also be switched, and this has a problem in that it makes the control system extremely complex.

The present invention is to solve such problems, and an aspect thereof is to provide an excitation coil for an electromagnetic flow meter wherein the excitation current can ramp up quickly, through effectively using the reverse induced voltage of the excitation coil L, while avoiding damaging the switching circuit through high-voltage.

SUMMARY

In order to achieve such an aspect, in an excitation circuit used in an electromagnetic flow meter for measuring a flow rate value for a fluid, based on an electromotive force, an excitation coil that is disposed on the outside of a measurement tube is supplied with an excitation current, where, in response, the electromotive force that is perpendicular to the magnetic field of the excitation coil that is generated in the fluid within the measurement tube is detected by a pair of electrodes that are disposed on the measurement tube. The excitation circuit includes: a switching circuit that generates, and supplies to the excitation coil, an AC excitation current from a driving current through connecting a current input terminal and a current output terminal, for a driving current that is supplied from the outside, to one end and the other end of the excitation coil, and switches based on an excitation signal that comprises a pulse signal that has an excitation frequency; and a charging/discharging circuit that charges, into the capacitive element, a reverse induced voltage that is generated in the excitation coil, and switches and supplies, as an excitation current to the one end or the other end of the excitation coil, a discharge current that is discharged from the capacitive element, based on the excitation signal. The switching circuit includes: a first switching circuit wherein one contact terminal is connected to the current input terminal, and which turns ON/OFF in accordance with the excitation signal; a second switching circuit, with one contact terminal connected to the current input terminal, and which turns ON/OFF in the opposite phase from the first switching circuit; a first diode wherein the anode terminal is connected to the other contact terminal of the first switching circuit and wherein the cathode terminal is connected to one end of the excitation coil; a second diode wherein the anode terminal is connected to the other contact terminal of the second switching circuit and wherein the cathode terminal is connected to the other end of the excitation coil; a third switching circuit wherein one contact terminal is connected to the cathode terminal of the first diode and to the one end of the excitation coil, and wherein the other contact terminal is connected to the current output terminal, and which turns ON/OFF in the opposite phase from the first switching circuit; and a fourth switching circuit wherein one contact terminal is connected to the cathode terminal of the second diode and to the other end of the excitation coil, and wherein the other contact terminal is connected to the current output terminal, and which turns ON/OFF in phase with the first switching circuit. The charging/discharging circuit includes: a diode bridge that rectifies the reverse induced voltage that is produced at the ends of the excitation coil, to charge the capacitive element; a first high-voltage switching circuit that supplies the discharge current to the first end of the excitation coil from the capacitive element, and which turns ON/OFF in phase with the first switching circuit; and a second high-voltage switching circuit that supplies the discharge current from the capacitive element to the other end of the excitation coil, and which turns ON/OFF in the opposite phase from the first switching circuit.

Moreover, the electromagnetic flow meter according to the present invention is provided with the excitation circuit set forth above.

With the present invention, the first and second diodes are able to prevent a high-voltage that is produced by the reverse induced voltage in the excitation circuit from being applied to the contact terminals of the first and second switching circuits. Moreover, the reverse induced voltage that is generated by the excitation coil is charged into the capacitive element through the diode bridge of the charging/discharging circuit, where the charged power of the capacitive element is supplied to the first and second high-voltage switching circuits of the charging/discharging circuit.

As a result, this makes it possible to use the reverse induced voltage of the excitation coil effectively, making it possible to speed up the rise of the excitation current.

BRIEF DESCRIPTIONS OF THE DRAWINGS

DETAILED DESCRIPTION

Forms for carrying out the present invention will be explained next in reference to the figures.

Example

An electromagnetic flow meter according to Example according to the present invention will be explained first in reference to FIG. 1.

Figure 1:
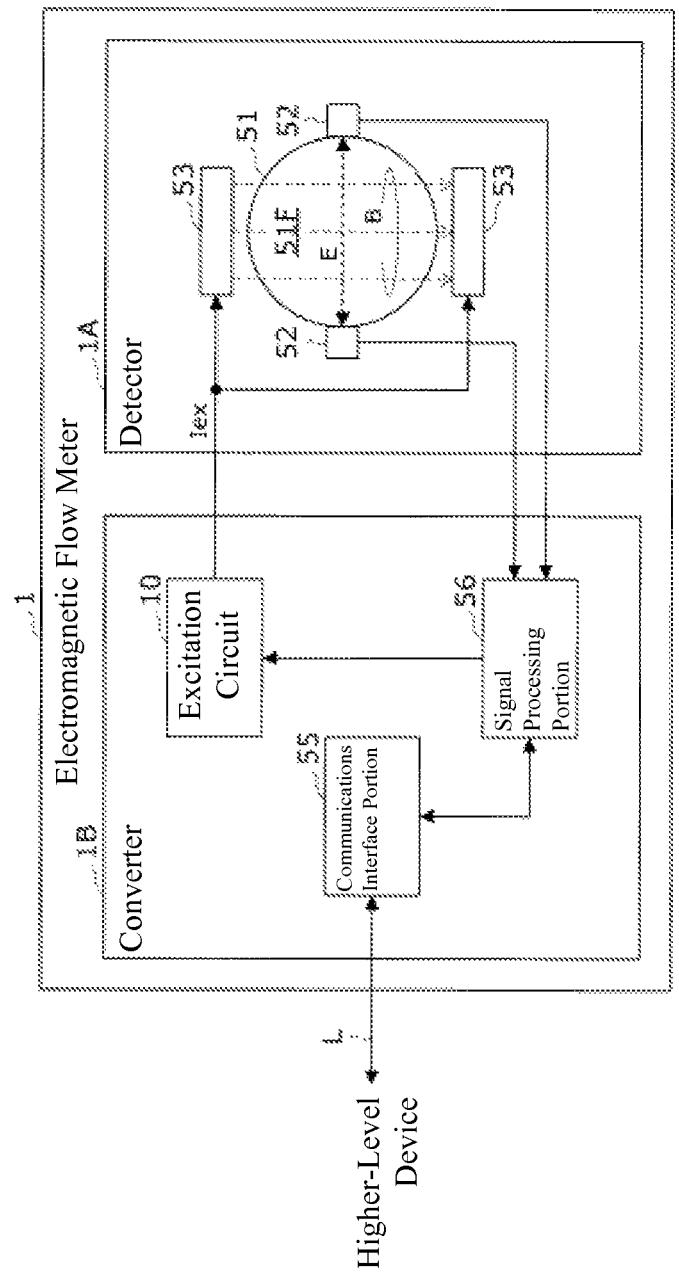
FIG. 1 is a block diagram illustrating a structure for an electromagnetic flow meter according to Example.

As illustrated in FIG. 1, this electromagnetic flow meter 1 is structured from a detector 1A and a converter 1B.

The detector 1A is provided with a measurement tube 51, electrodes 52, and excitation coils 53, as the primary structures thereof.

The measurement tube 51, as a whole, is made from a cylinder of a non-magnetic metal, such as stainless steel, and, on the inside thereof, has a flow path 51F for the fluid that is subject to measurement.

The excitation coil 53 are made from a pair of coils that are disposed facing the outsides of the measurement tube 51, and have a function for generating a magnetic field B, in a direction that is perpendicular to the direction of flow of the fluid that is flowing within the flow path 51F, in accordance with an excitation current Iex that is supplied from a converter 1B.

The electrodes 52 comprise a pair of electrodes that are disposed so as to contact the fluid that is flowing within the flow path 51F, on the inner wall of the measurement tube 51, facing a direction that is perpendicular to the direction of the magnetic field B that is produced by the excitation coil 53, and have a function for detecting, and outputting to the converter 1B, an electromotive force E that is produced within the fluid in accordance with the excitation of the fluid by the magnetic field B.

The converter 1B has, as its primary circuit portions, a communication interface portion 55, a signal processing portion 56, and an excitation circuit 10.

The communication interface portion 55 is connected to a higher-level device (not shown), such as a controller, through a signal line W, and has a function for generating an operating power supply from the electric power that is supplied through the signal line W from the higher-level device to supply the various functional portions, and a function for sending, to the higher-level device through the signal line W through data communication, a flow rate value for the fluid, obtained from the signal processing portion 56.

The signal processing portion 56 has a function for generating, and outputting to the excitation circuit 10, an excitation signal comprising pulse signals that have a specific excitation frequency, a function for calculating a fluid flow rate through sampling and performing signal processing based on the signal amplification and the excitation frequency, of the electromotive force E detected by the electrodes 52, and a function for outputting, to the communication interface portion 55, the flow rate value thus obtained.

The excitation circuit 10 has a function for generating, and providing to the excitation coil 53, a square wave AC excitation current for switching and controlling the excitation polarity, based on the excitation signal from the signal processing portion 56.

Figure 2:
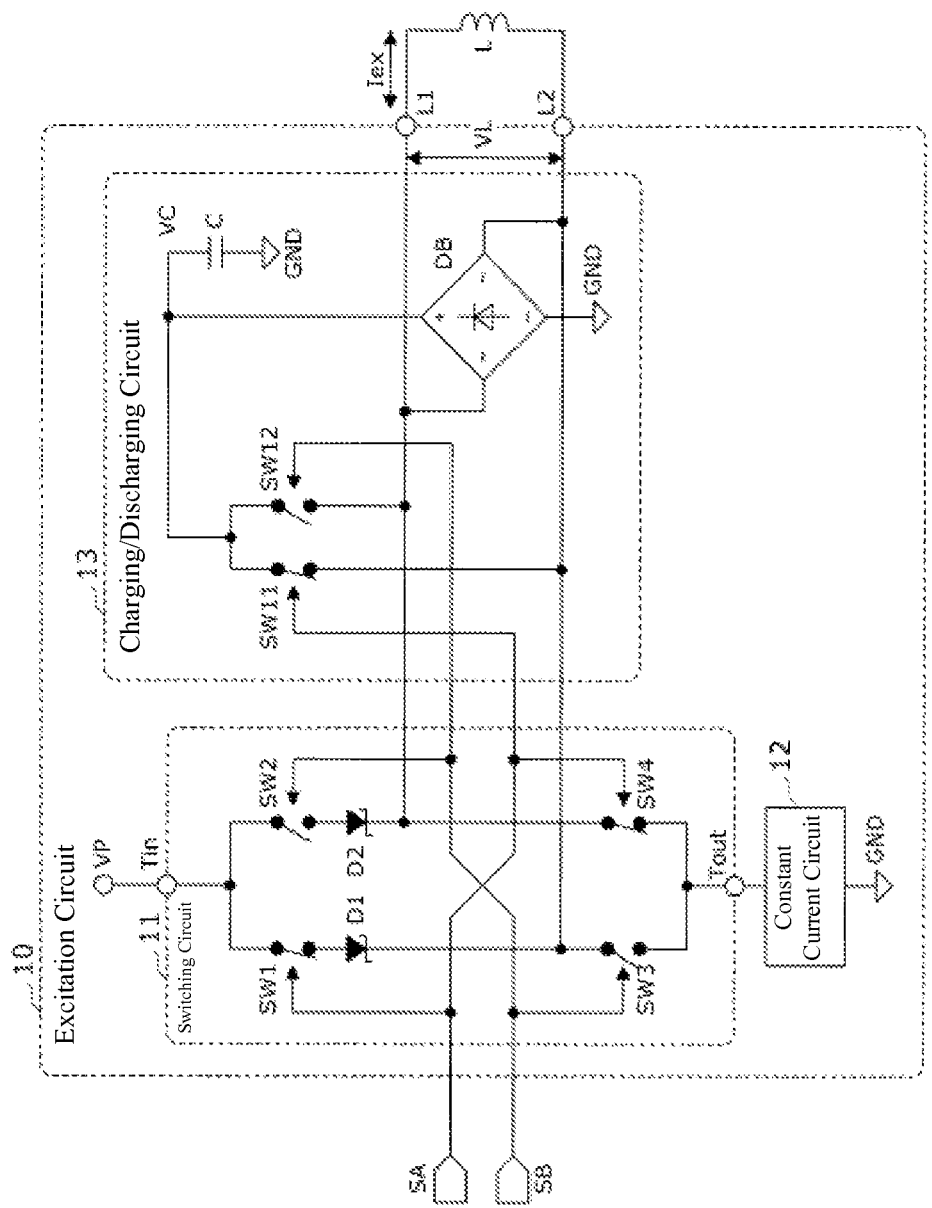
FIG. 2 is a circuit diagram illustrating the structure of the excitation circuit according to the Example.

FIG. 2 will be referenced next to explain an electromagnetic flow meter excitation circuit 10 according to the Example according to the present invention.

This excitation circuit 10 is a circuit for supplying an excitation current to the excitation coil in the electromagnetic flow meter.

Typically, in electromagnetic flow meters for measuring the flow rate of a fluid that is electrically conductive, the flow rate of the fluid that flows within a measurement pipe is measured by providing a magnetic excitation electric current that alternatingly switches polarities to a magnetic excitation coil that is disposed so that the direction of the magnetic field that is produced is perpendicular to the direction of flow of the fluid that is flowing within the measurement pipe, to detect the electromotive force that is produced between a pair of electrodes that are disposed within the measurement pipe perpendicular to the magnetic field produced by the magnetic excitation coil, and sampling and performing signal processing after amplifying the electromotive force that is produced between the electrodes.

In FIG. 2, the excitation circuit 10 is structured from a switching circuit 11 a constant current circuit 12, and a charging/discharging circuit 13.

As illustrated in FIG. 2, described above, the constant current circuit 12 is a typical constant current circuit such as structured from an emitter-follower circuit made from, for example, a transistor Q, an op-amp OP, and a resistive element R, connected between the current output terminal Tout from the switching circuit 11 and the ground electropotential GND, where the driving current is supplied at a constant current from a power supply voltage VP to the switching circuit 11.

The switching circuit 11 has an electric current inputting terminal Tin and electric current outputting terminal Tout for a driving current that is supplied from the outside, and has a function for generating, and supplying to the excitation coil L, an AC excitation current Iex from the driving current, through switching the connections of the electric current inputting terminal Tin and the electric current outputting terminal Tout with the terminal L2 (one end) and the terminal L1 (the other end) of the excitation coil L based on an excitation signal SA and an excitation signal SB that are pulsed signals of an excitation frequency Fex that have a mutually complementary phase relationship.

The charging/discharging circuit 13 has a function for charging the reverse induced voltage, produced in the excitation coil L, into the capacitive element C that is connected between the electric current inputting terminal Tin and the ground electropotential GND, and a function for switching, and providing to the excitation coil L terminal L2 (the one end) or terminal L1 (the other end), as the excitation current Iex, the discharge current that is discharged from the capacitive element C, based on the excitation signals SA and SB.

In the present example, the switching circuit 11 has: a switching circuit SW1 (first switching circuit) wherein one contact terminal is connected to the current input terminal Tin and is turned ON/OFF in accordance with the excitation signal SA; a switching circuit SW2 (a second switching circuit) wherein one contact terminal is connected to Tin, and is turned ON/OFF in the opposite phase from that of the switching circuit SW1, in accordance with the excitation signal SB; a diode D1 (a first diode) wherein the anode terminal is connected to the other contact terminal of SW1, and the cathode terminal is connected to terminal L2 (the one end) of the excitation coil L; and a diode D2 (a second diode), wherein the anode terminal is connected to the other contact terminal of SW2 and the cathode terminal is connected to the terminal L1 (the other terminal) of the excitation coil L.

In addition, the switching circuit 11 has: a switching circuit SW3 (a third switching circuit) wherein one contact terminal is connected to the cathode terminal of D1 and to L2, and the other contact terminal is connected to the current output terminal Tout, to be turned ON/OFF in the phase opposite from SW1, in accordance with SB; and a switching circuit SW4 (a fourth switching circuit) wherein one contact terminal is connected to the cathode terminal of D2 and to L1, and the other contact terminal is connected to Tout, to be turned ON/OFF in phase with SW1, in accordance with SA.

Moreover, the charging/discharging circuit 13 has: a diode bridge DB for rectifying the reverse induced voltage that is produced between the terminals L1-L2 (the two terminals) of the excitation coil L and charging it into the capacitive element C; a switching circuit SW11 (a first high-voltage switching circuit) that turns ON/OFF in phase with SW1, in accordance with SA, to supply the discharge current to the terminal L2 of the excitation coil L from the capacitive element C; and a switching circuit SW12 (a second high-voltage switching circuit) that turns ON/OFF in the phase opposite from SW1, in accordance with SB, to supply the discharge current to the terminal L2 of the excitation coil L from the capacitive element C.

At this time, the AC terminals of the DB are connected, respectively, to L1 and L2, where the plus terminal is connected to one end of the capacitive element C, and the minus terminal is connected to the ground electropotential GND. The use of a Schottky diode structure in this DB can reduce the voltage drop in the forward direction in the individual diodes that structure the DB.

In this way, in the present example, the capacitive element C is cut off from the current input terminal Tin of the switching circuit 11, and D1 and D2 are provided, to prevent reverse flow, between SW1 and SW2 of the switching circuit 11 and the terminals L1 and L2 of the excitation coil L. Consequently, not only does this make it possible to avoid applying, to the contact terminals of SW1 and SW2, through Tin from C, the high reverse induced voltage that is produced by the excitation coil L, but this also makes it possible to prevent, through D1 and D2, application of the high reverse induced voltage, produced by the excitation coil L, to the contact terminals of SW1 and SW2. Note that the use of Schottky diodes for D1 and D2 makes it possible to reduce the forward voltage drop in D1 and D2.

Moreover, SW11 and SW12 are provided between the capacitive element C and the terminals L1 and L2, and are turned ON/OFF respectively in-phase with, or in the opposite phrase from, SW1 through SW4, based on SA and SB. Doing so makes it possible to provide the discharge current from the capacitive element C to the terminals L1 and L2 of the excitation coil L, together with the polarity of the excitation current Iex, even when Tin is cut off from C.

Operation of the Example

Figure 3:
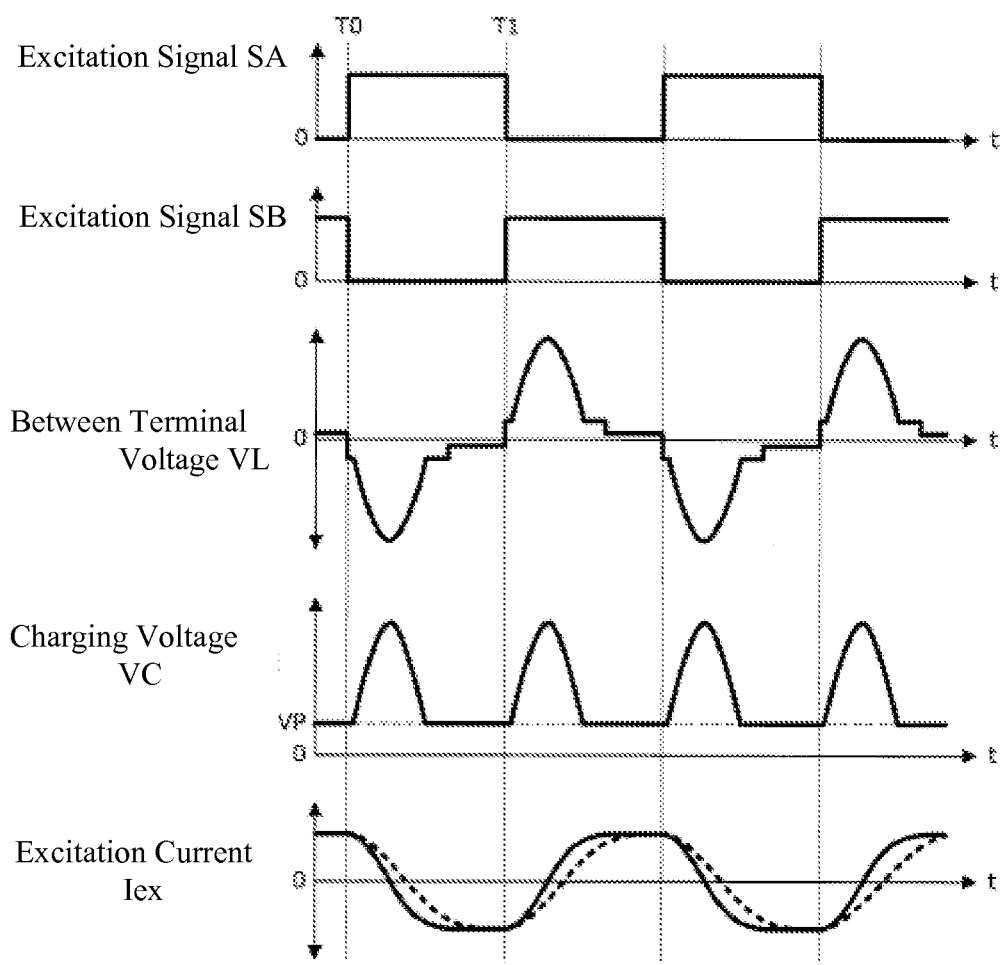
FIG. 3 is a waveform diagram illustrating the operation of the excitation circuit according to the Example.

The operation of the excitation circuit 10 according to the present example will be explained next in reference to FIG. 2 and FIG. 3. FIG. 3 is a signal waveform circuit illustrating the operation of the magnetic excitation circuit according to the Example.

As shown at time T0 in FIG. 3, when there is a rising edge of SA and a falling edge of SB, SW1 and SW4 turn ON, and SW2 and SW3 turn OFF. Because of this, a path is formed, as the path for the driving current from Tin, through SW1→terminal L2→excitation coil L→terminal L1→SW4→Tout→constant current circuit 12, to perform polarity switching of the excitation current Iex.

In this way, when the polarity of the excitation current Iex is switched, the self-inductance of the excitation coil L produces a reverse induced voltage across the ends L1-L2 of the excitation coil L.

For example, at time T0, when the excitation current Iex is switched from the L1→L2 direction where it has been until this point, to the L2→L1 direction, the reverse induced voltage that is produced between the terminals L1-L2 causes the voltage at L2 to be higher than the voltage at L1. Doing so makes it possible to produce a negative voltage as the between-terminal voltage VL between the terminals L1 and L2, where this reverse induced voltage is charged into the capacitive element C through the DB.

Moreover, because SW11 is ON at time T0, the reverse induced voltage that is charged into the capacitive element C is applied to L2 through SW11. As a result, over the interval wherein the reverse induced voltage that is applied to L2 from the capacitive element C through SW11 is higher than the voltage that is applied to L2 through SW1 and D1 from the power supply voltage VP, the discharge current will be supplied from the capacitive element C to L2. This enables the provision of greater electric power to L2 reducing the delay from the timing of the switching of the excitation signals SA and SB until the excitation current Iex arrives at the maximum value. As a result, this makes it possible to cause the falling (or rising) of the excitation current Iex to be faster than when compared to the case wherein the reverse induced voltage of the excitation coil L is not used (the waveform indicated by the dotted line in FIG. 3).

At this time, the high reverse induced voltage that is produced at L2 is applied also to the switching circuit 11 side, but damage to the SW1 can be prevented because the reverse induced voltage that is produced at L2 is not applied to the contact terminal of SW1, due to D1 for preventing the reverse flow, connected between L2 and the contact terminal of the switching circuit SW1. The power supply voltage VP is always applied to the contact terminal on the Tin side of SW1.

This makes it possible to use a low-resistance MOSFET as SW1, because there is no need to use a high-voltage MOSFET. This makes it possible to eliminate the reduction in the excitation current Iex at SW1, which, as an effect, makes it possible to drive the excitation coil L more efficiently through the power supply voltage VP.

Furthermore, there is no need for turning the high reverse induced voltages ON and OFF by SW1, and thus there is no need to switch the voltage of the gate voltage side in accordance with variations of voltage on the contact terminal side in SW1, making it possible to avoid greater complexity in the control system circuits.

Note that while the high reverse induced voltage that is produced in L2 is applied also to the contact terminal of SW3 of the switching circuit 11, this contact terminal is typically the drain terminal of a MOSFET (N-channel), so the MOSFET will not undergo any damage, even if not of a high-voltage type.

Moreover, the high reverse induced voltage that is produced at L2 is applied also to the contact terminal of SW11 of the charging/discharging circuit 13, but SW11 is of a high-voltage type, using, for example, a high-voltage MOSFET, so there is no risk of damage. At this time, the resistance in SW11 is relatively large when compared to that of a normal switching circuit, but this resistance SW11 only reduces the discharge current portion, wherein there is surplus electric power, that is discharged from the capacitive element C to the excitation coil L, from the excitation current Iex. Consequently, for the part that is the driving current that is supplied from the power supply voltage VP to the excitation coil L, wherein there is little surplus in the electric power, this part can be supplied efficiently, with no reduction.

On the other hand, as shown at time T1, at the following edge of SA and the rising edge of SB, SW1 and SW4 are turned OFF and SW2 and SW3 are turned ON. Because of this, a path is formed, as the path for the driving current from Tin, through SW2→terminal L1→excitation coil L→terminal L2→SW3→Tout→constant current circuit 12, to perform polarity switching of the excitation current Iex.

Here, at time T1, when the excitation current Iex is switched from the L2→L1 direction where it has been until this point, to the L1→L2 direction, the reverse induced voltage that is produced between the terminals L1-L2 causes the voltage at L1 to be higher than the voltage at L2. Doing so makes it possible to produce a positive voltage as the between-terminal voltage VL between the terminals L1 and L2, where this reverse induced voltage is charged into the capacitive element C through the DB.

Moreover, because SW12 is ON at time T1, the reverse induced voltage that is charged into the capacitive element C is applied to L1 through SW12. As a result, over the interval wherein the reverse induced voltage that is applied to L1 from the capacitive element C through SW11 is higher than the voltage that is applied to L1 through SW2 and D2 from the power supply voltage VP, the discharge current will be supplied from the capacitive element C to L1. This enables the provision of greater electric power to L1 reducing the delay from the timing of the switching of the excitation signals SA and SB until the excitation current Iex arrives at the maximum value. As a result, this makes it possible to cause the rising (or falling) of the excitation current Iex to be faster than when compared to the case wherein the reverse induced voltage of the excitation coil L is not used (the waveform indicated by the dotted line in FIG. 3).

At this time, the high reverse induced voltage that is produced at L1 is applied also to the switching circuit 11 side, but damage to the SW2 can be prevented because the reverse induced voltage that is produced at L1 is not applied to the contact terminal of SW2, due to D2 for preventing the reverse flow, connected between L1 and the contact terminal of the switching circuit SW2. The power supply voltage VP is always applied to the contact terminal on the Tin side of SW2.

This makes it possible to use a low-resistance MOSFET as SW2, because there is no need to use a high-voltage MOSFET. This makes it possible to eliminate the reduction in the excitation current Iex at SW2, which, as an effect, makes it possible to drive the excitation coil L more efficiently through the power supply voltage VP.

Furthermore, there is no need for turning the high reverse induced voltages ON and OFF by SW2, and thus there is no need to switch the voltage of the gate voltage side in accordance with variations of voltage on the contact terminal side in SW2, making it possible to avoid greater complexity in the control system circuits.

Note that while the high reverse induced voltage that is produced in L1 is applied also to the contact terminal of SW4 of the switching circuit 11, this contact terminal is typically the drain terminal of a MOSFET (N-channel), so the MOSFET will not undergo any damage, even if not of a high-voltage type.

Moreover, the high reverse induced voltage that is produced at L1 is applied also to the contact terminal of SW12 of the charging/discharging circuit 13, but SW12 is of a high-voltage type, using, for example, a high-voltage MOSFET, so there is no risk of damage. At this time, the resistance in SW12 is relatively large when compared to that of a normal switching circuit, but this resistance SW12 only reduces the discharge current portion, wherein there is surplus electric power, that is discharged from the capacitive element C to the excitation coil L, from the excitation current Iex. Consequently, for the part that is the driving current that is supplied from the power supply voltage VP to the excitation coil L, wherein there is little surplus in the electric power, this part can be supplied efficiently, with no reduction.

In this way, in the present example the switching circuit 11 switches the driving current that flows from the current input terminal Tin to the current output terminal Tout that is supplied, as the excitation current Iex, to the excitation coil L through D1 and D2, depending on the excitation signals SA and SB, and the charging/discharging circuit 13 charges the reverse induced voltage, from the excitation coil L, through the DB into the capacitive element C, where the discharge current from the capacitive element C is supplied to the excitation coil L by the high-voltage-type SW11 and SW12, switched together with the polarity of the excitation current Iex.

Specifically, the switching circuit 11 is provided with: SW1, which turns ON/OFF in accordance with SA, with one contact terminal connected to Tin; SW2, which turns ON/OFF in the opposite phase from SW1, with one contact terminal connected to Tin; D1, which has the anode terminal thereof connected to the other contact terminal of SW1, and the cathode terminal thereof connected to L2; D2, which has the anode terminal thereof connected to the other contact terminal of SW2, and the cathode terminal thereof connected to L1; SW3, which has one contact terminal connected to the cathode terminal of D1 and to L2, and the other contact terminal connected to the Tout, and which turns ON/OFF in the opposite phase from SW1; and SW4, which has one contact terminal connected to the cathode terminal of D2 and to L1, and which has the other contact terminal connected to Tout, and which turns ON/OFF in phase with SW1; where the charging/discharging circuit 13 is provided with a DB, for rectifying, and charging into C, the reverse induced voltage that is produced between L1 and L2, a high-voltage SW11, which turns ON/OFF in phase with SW1, for supplying the discharge current from C to L2, and a high-voltage SW12, which turns ON/OFF in the opposite phase from SW1, for supplying the discharge current from C to L1.

In this way, the present example cuts off the capacitive element C from the current input terminal Tin of the switching circuit 11, and provides reverse-flow prevention through D1 and D2 that are provided between SW1 and SW2 of the switching circuit 11 and the terminals L1 and L2 of the excitation coil L.

Consequently, it becomes possible to avoid applying, to the contact terminals SW1 and SW2, from C through Tin, the high reverse induced voltages that are generated in the excitation coil L, and possible to prevent, through D1 and D2, the application of the high reverse induced voltage, generated by the excitation coil L, to the contact terminals of SW1 and SW2. Note that the use of Schottky diodes for D1 and D2 makes it possible to reduce the forward voltage drop in D1 and D2.

Because of this, high-voltage MOSFETs are not used for SW1 and SW2, enabling the use of low-resistance MOSFETs. This makes it possible to prevent the reduction in the excitation current Iex in SW1 and SW2, and, as a result, enables efficient driving of the excitation coil L by the power supply voltage VP.

Furthermore, there is no need for turning the high reverse induced voltages ON and OFF by SW1 and SW2, and thus there is no need to switch the voltage of the gate voltage side in accordance with variations of voltage on the contact terminal side in SW1 and SW2, making it possible to avoid greater complexity in the control system circuits.

Note that the high reverse induced voltage that is generated in the excitation coil L is also applied to the contact terminals for SW3 and SW4, and these are typically drain terminals of MOSFETs (N-channel), and so the MOSFETs will not be damaged even if not of the high-voltage type.

Moreover, in the present example, high-voltage switches SW11 and SW12 are provided between the capacitive element C and the terminals L1 and L2, as charging/discharging circuits 13, and are turned ON or OFF in either the same phase or the opposite face of SW1 through SW4, based on SA and SB, so that even if C is cut off from Tin, it is still possible to provide the discharge current from the capacitive element C to the terminals L1 and L2 of the excitation coil L, matching the polarity of the excitation current Iex.

Note that while the high reverse induced voltage that is generated in the excitation coil L is applied also to the contact terminals of SW11 and SW12, SW11 and SW12 are of the high-voltage type, and thus there is no need to worry about damage. At this time, the SW11 and SW12 ON resistances are of values that are high when compared to switching circuits of the normal type, this does nothing but reduce the discharge current part of the excitation current Iex, wherein there is a surplus of electric power, discharged from the capacitive element C to the excitation coil L. Consequently, for the part that is the driving current that is supplied from the power supply voltage VP to the excitation coil L, wherein there is little surplus in the electric power, this part can be supplied efficiently, with no reduction.

Note that while, in the present example, the explanation was for an example of a case wherein SW1, SW4, and SW11 were turned ON/OFF based on SA, and SW2, SW3, and SW12 were turned ON/OFF based on SB, there is no limitation thereto. Insofar as the ON/OFF operating relationships between these switching circuits are as described above, the combinations of the control logic of the various switching circuits, and the combinations of these switching circuits with SA and SB may be selected arbitrarily.

Another Example

Figure 4:
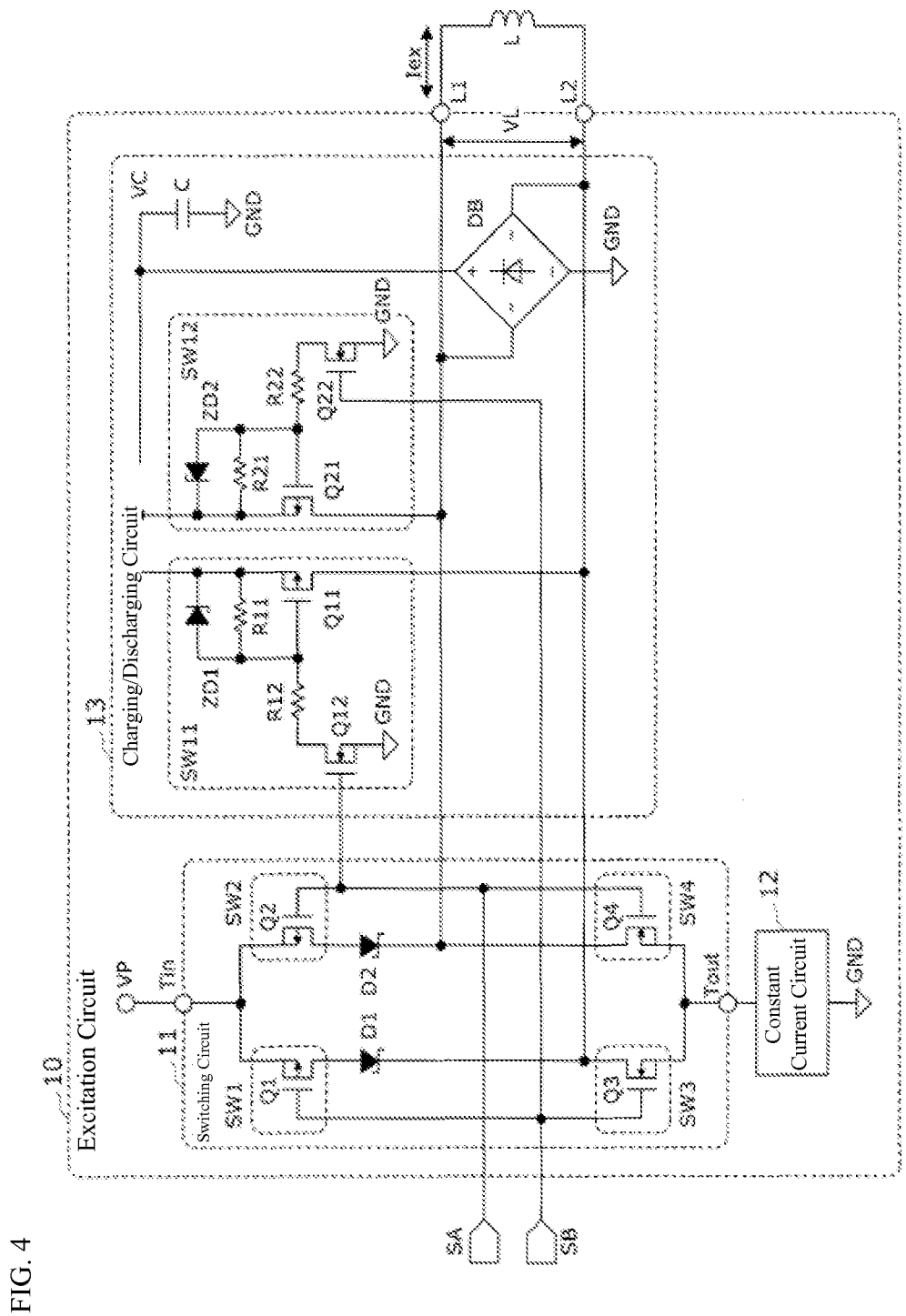
FIG. 4 is a circuit diagram illustrating an excitation circuit according to Another Example.
Figure 5:
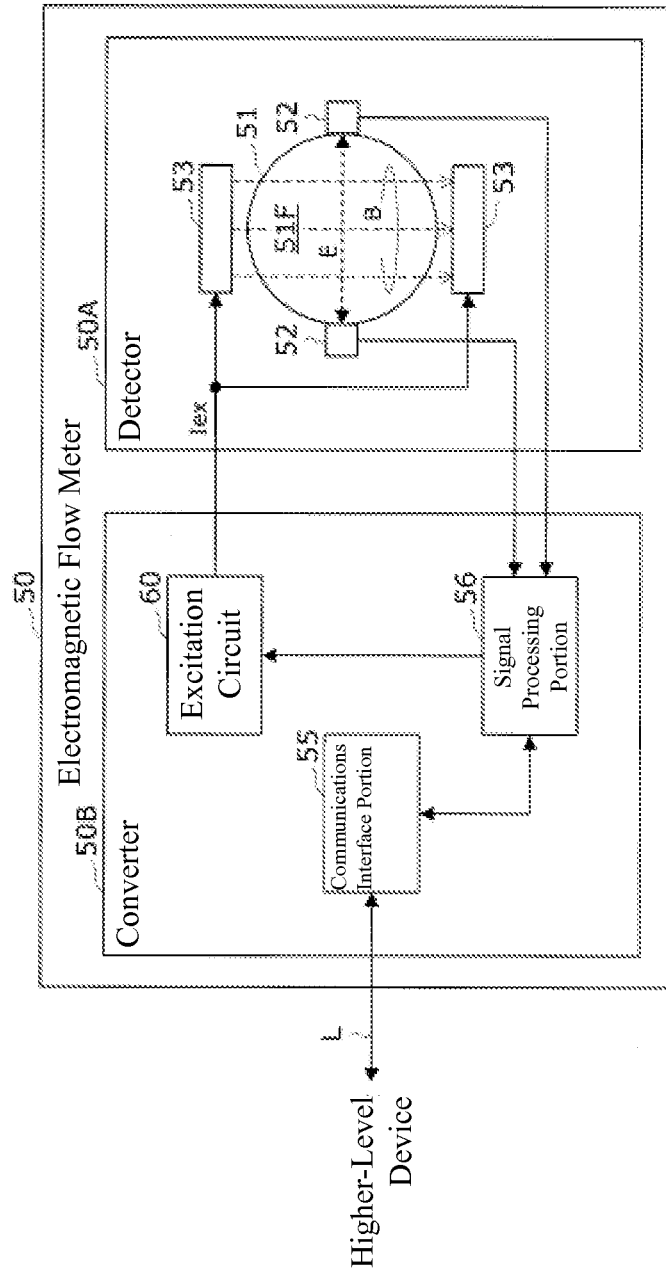
FIG. 5 is a block diagram illustrating a typical structure for an electromagnetic flow meter.
Figure 6:
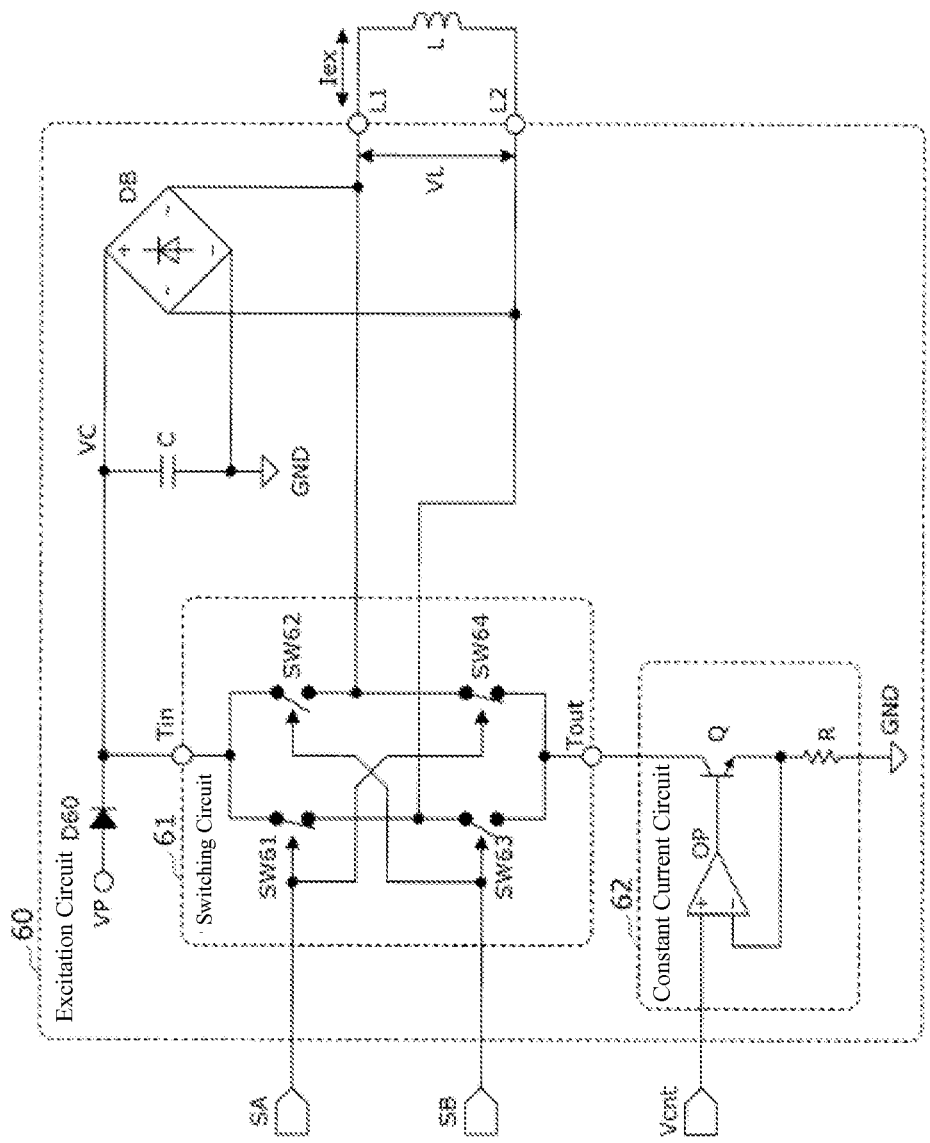
FIG. 6 is a circuit illustrating a conventional excitation circuit.
Figure 7:
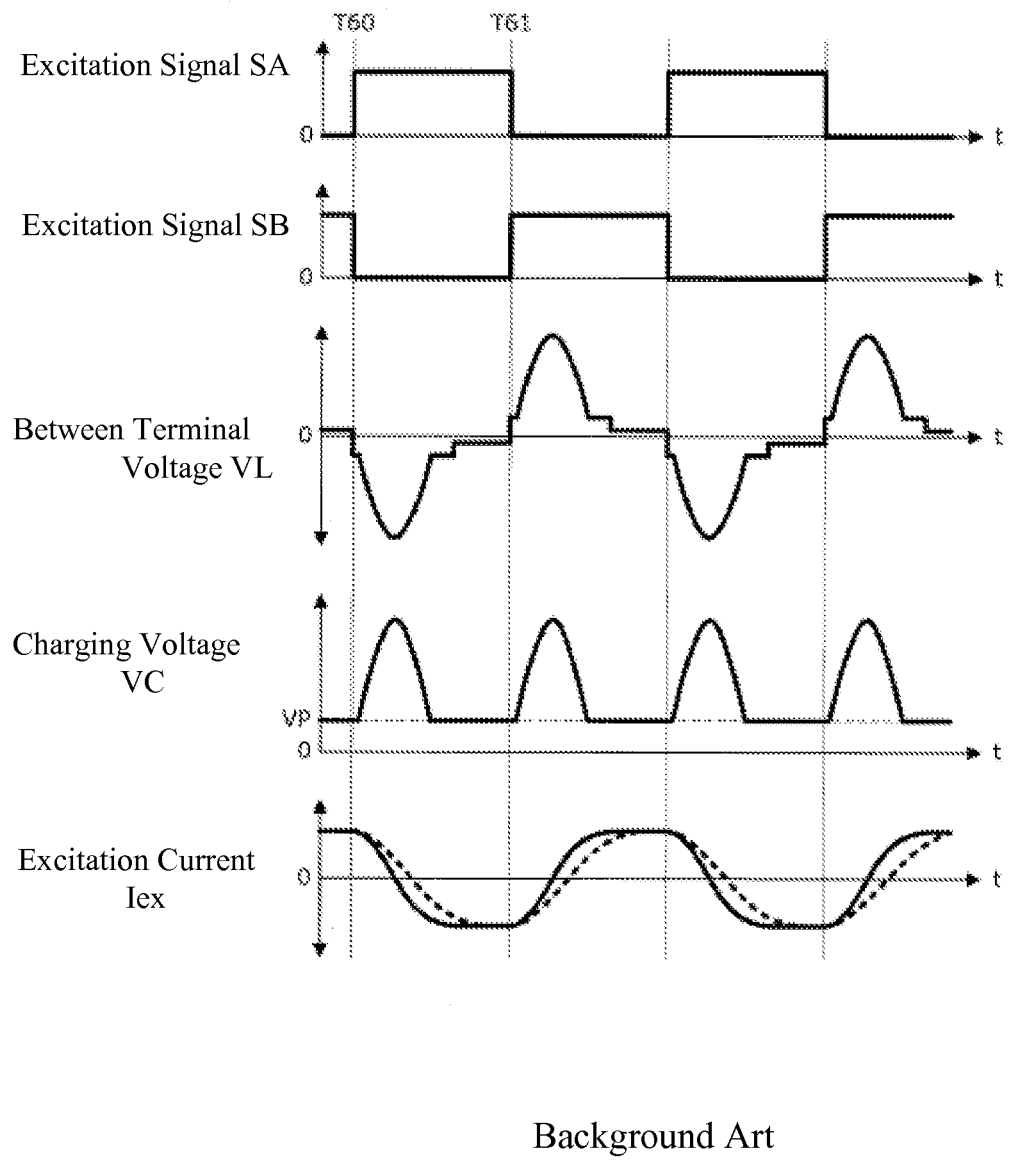
FIG. 7 is a signal waveform diagram illustrating the operation of a conventional excitation circuit.

Next an excitation circuit according to Another Example according to the present disclosure will be explained in reference to FIG. 4. In FIG. 4, those parts that are similar or identical to those in FIG. 2, described above, are assigned identical codes.

The Example was explained as an example of a case wherein switching circuits of a high-voltage type, which used high-voltage MOSFETs, were used for the high-voltage switching circuits SW11 and SW12. The present example will explain a case wherein the high-voltage SW11 and SW12 are structured using standard voltage MOSFETs, rather than high-voltage MOSFETs.

In FIG. 4, SW11 is structured from a P-channel MOSFET (first P-channel MOSFET) Q11 wherein the source terminal is connected to a capacitive element C, and the drain terminal is connected to the terminal L2 (one end) of the excitation coil L, a resistive element (first resistive element) R11 that is connected between the gate terminal and the source terminal of Q11, a constant voltage diode (first constant voltage diode) ZD1 wherein the anode terminal is connected to the gate terminal of Q11 and the cathode terminal is connected to the source terminal of Q11, and an N-channel MOSFET (first switching element) Q12 that is turned ON/OFF in phase with SW1, to control Q11 ON/OFF through controlling the gate terminal voltage of Q11 through a resistive element (second resistive element) R12.

Moreover, SW12 is structured from a P-channel MOSFET (second P-channel MOSFET) Q21 wherein the source terminal is connected to a capacitive element C, and the drain terminal is connected to terminal L1 (the other end) of the of the excitation coil L, a resistive element (third resistive element) R21 that is connected between the gate terminal and the source terminal of Q21, a constant voltage diode (second constant voltage diode) ZD2 wherein the anode terminal is connected to the gate terminal of Q21 and the cathode terminal is connected to the source terminal of Q21, and an N-channel MOSFET (second switching element) Q22 that is turned ON/OFF in the opposite phase from SW1, to control Q21 ON/OFF through controlling the gate terminal voltage of Q21 through a resistive element (fourth resistive element) R22.

Note that FIG. 4 shows an example of structuring the switching circuits SW11 through SW14 of the switching circuit 11 from MOSFETs.

SW1 is structured from a P-channel MOSFET Q1, wherein the source terminal is connected to Tin, the drain terminal is connected to the anode terminal of D1, and the gate terminal is connected to the SB. SW2 is structured from a P-channel MOSFET Q2, wherein the source terminal is connected to Tin, the drain terminal is connected to the anode terminal of D2, and the gate terminal is connected to the SA.

Moreover, SW3 is structured from an N-channel MOSFET Q3, wherein the source terminal is connected to Tout, the drain terminal is connected to the cathode terminal of D1, and the gate terminal is connected to the SB. SW4 is structured from a N-channel MOSFET Q4, wherein the source terminal is connected to Tout, the drain terminal is connected to the cathode terminal of D2, and the gate terminal is connected to the SA.

While the present example illustrates an example wherein SW1 through SW4 were structured from Q1 through Q4, there is no limitation thereto, but rather they need only have the same function as in the Example.

Operation of the Another Example

The operation of the excitation circuit according to the present example will be explained next in reference to FIG. 4. See FIG. 3, described above, regarding the signal waveforms.

As illustrated at time T0, when SA is rising and SB is falling, Q22 of SW12 goes ON, so that a voltage wherein the voltage difference between the Q21 source terminal and the ground electropotential GND has been resistance-divided by R21 and R22 will be applied to the gate terminal of Q21. At this time, the resistance values of R21 and R22 are set in advance so as to cause the resistance-divided voltage to cause Q21 to turn ON.

Consequently, Q21 turns ON, to supply a discharge current from the capacitive element C to the terminal L1.

At this time, the high reverse induced voltage that is produced at L2 of the excitation coil L is applied to the source terminal of Q21 through the DB; however, the zener voltage of ZD2 is set to be no more than the maximum rating for the source-gate voltage of Q21. Because of this, the source-gate voltage of Q21 is limited to being within the maximum rating for Q21, so Q21 undergoes no damage.

Additionally, because at time T0, Q12 of SW11 is OFF, the same voltage as with the source terminal of Q11, through the resistance R11, is applied to the gate terminal of Q11, so Q11 is turned OFF.

At this time, the high reverse induced voltage that is generated at L2 of the excitation coil L is applied to the drain terminal of Q11, and, similarly, is applied to the drain terminal of Q12 through the DB and R11 and R12, but because the drain-gate withstand voltage and drain-source withstand-voltage in a MOSFET of a standard type is adequately high, Q11 and Q12 do not become damaged despite not being of a high-voltage type.

On the other hand, as illustrated at time T1, when SA is falling and SB is rising, Q12 of SW11 goes ON, so that a voltage wherein the voltage difference between the Q11 source terminal and the ground electropotential GND has been resistance-divided by R11 and R12 will be applied to the gate terminal of Q11. At this time, the resistance values of Q11 and R12 are set in advance so as to cause the resistance-divided voltage to cause R11 to turn ON.

Consequently, Q11 turns ON, to supply a discharge current from the capacitive element C to the terminal L1.

At this time, the high reverse induced voltage that is produced at L1 of the excitation coil L is applied to the source terminal of Q11 through the DB; however, the zener voltage of ZD1 is set to be no more than the maximum rating for the source-gate voltage of Q11. Because of this, the source-gate voltage of Q11 is limited to being within the maximum rating for Q11, so Q11 undergoes no damage.

Additionally, because at time T1, Q22 of SW12 is OFF, the same voltage as with the source terminal of Q21, through the resistance R21, is applied to the gate terminal of Q21, so Q21 is turned OFF.

At this time, the high reverse induced voltage that is generated at L1 of the excitation coil L is applied to the drain terminal of Q21, and, similarly, is applied to the drain terminal of R22 through the DB and R21 and Q22, but because the drain-gate withstand voltage and drain-source withstand-voltage in a MOSFET of a standard type is adequately high, Q21 and Q22 do not become damaged despite not being of a high-voltage type.

As described above, in the present example S11 is structured from Q11 wherein its source terminal is connected to C and its drain terminal is connected to L2, R11 that is connected between the gate terminal and source terminal of Q11, ZD1 wherein the anode terminal is connected to the gate terminal of Q11 and the cathode terminal is connected to the source terminal of Q11, and Q12, for turning Q11 ON/OFF, turning it ON and OFF in the same phase as SW1, through controlling the gate terminal voltage of Q11 through R12, and S12 is structured from Q21 wherein its source terminal is connected to C and its drain terminal is connected to L1, Q21 that is connected between the gate terminal and source terminal of R21, ZD2 wherein the anode terminal is connected to the gate terminal of Q21 and the cathode terminal is connected to the source terminal of Q21, and Q22, for turning Q21 ON/OFF, turning it ON and OFF in the opposite phase from SW1, through controlling the gate terminal voltage of Q21 through R22.

Because, as a result thereof, there is no need to use high-voltage MOSFETs for Q11 and Q21, MOSFETs with little resistance can be used. This makes it possible to prevent the reduction in excitation current Iex in SW11 and SW12, with the result that, when compared to the Example, it is possible to drive the excitation coil L more efficiently through the charging power of C.

Note that the high reverse induced voltage that is generated in the excitation coil L is applied to the source terminals of Q21 and Q22, through the DB, but because the increases in the gate-source voltages are limited by ZD1 and ZD2, Q21 does not experience any damage.

Moreover, the reverse induced voltage is applied to the drain terminals of Q11, Q12, Q21, and Q22, but the withstand-voltage between the drain and the gate of the MOSFET, and the withstand-voltage between the drain and the source of the MOSFET are adequately high, even if not of a high-voltage type, so Q11, Q12, Q21, and Q22 experience no damage.

Consequently, in the present invention it is possible to structure high-voltage SW11 and SW12 using standard voltage MOSFETs, wherein the resistance is low, rather than requiring high-voltage MOSFETs. As a result, this suppresses the reduction in the discharge current from the capacitive element C in S11 and S12, to be provided efficiently to the excitation coil L.

Note that while, in the present example, the explanation was for an example of a case wherein Q2, Q3, and Q12 were turned ON/OFF based on SA, and Q1, Q4, and Q22 were turned ON/OFF based on SB, there is no limitation thereto.

Insofar as the ON/OFF operating relationships between these MOSFETs are as described above, the combinations of the control logic of the various MOSFETs, and the combinations of these MOSFETs with SA and SB may be selected arbitrarily.

Expanded Examples

While the present disclosure was explained above in reference to the examples, the present disclosure is not limited by the examples set forth above. The structures and details of the present disclosure may be modified in a variety of ways, as can be understood by those skilled in the art, within the scope of the present disclosure. Moreover, the present disclosure may be embodied through combining the various examples, insofar as there are no contradictions.

The invention claimed is:

1. An excitation circuit used in an electromagnetic flow meter for measuring a flow rate value for a fluid, based on an electromotive force, wherein an excitation coil that is disposed on the outside of a measurement tube is supplied with an excitation current, where, in response, the electromotive force that is perpendicular to the magnetic field of the excitation coil that is generated in the fluid within the measurement tube is detected by a pair of electrodes that are disposed on the measurement tube, the excitation circuit comprising:

a switching circuit that generates and supplies to the excitation coil, an AC excitation current from a driving current through connecting a current input terminal and a current output terminal, for a driving current that is supplied from the outside, to one end and the other end of the excitation coil, and switches based on an excitation signal that comprises a pulse signal that has an excitation frequency; and a charging/discharging circuit that charges, into a capacitive element, a reverse induced voltage that is generated in the excitation coil, and switches and supplies, as an excitation current to the one end or the other end of the excitation coil, a discharge current that is discharged from the capacitive element, based on the excitation signal, wherein:

the switching circuit comprises:

a first switching circuit wherein one contact terminal is connected to the current input terminal, and which turns ON/OFF in accordance with the excitation signal;

a second switching circuit, with one contact terminal connected to the current input terminal, and which turns ON/OFF in the opposite phase from the first switching circuit;

a first diode wherein the anode terminal is connected to the other contact terminal of the first switching circuit and wherein the cathode terminal is connected to one end of the excitation coil;

a second diode wherein the anode terminal is connected to the other contact terminal of the second switching circuit and wherein the cathode terminal is connected to the other end of the excitation coil;

a third switching circuit wherein one contact terminal is connected to the cathode terminal of the first diode and to the one end of the excitation coil, and wherein the other contact terminal is connected to the current output terminal, and which turns ON/OFF in the opposite phase from the first switching circuit; and a fourth switching circuit wherein one contact terminal is connected to the cathode terminal of the second diode and to the other end of the excitation coil, and wherein the other contact terminal is connected to the current output terminal, and which turns ON/OFF in phase with the first switching circuit; and the charging/discharging circuit comprises:
- a diode bridge that rectifies the reverse induced voltage that is produced at the ends of the excitation coil, to charge the capacitive element;
- a first high-voltage switching circuit that supplies the discharge current to the first end of the excitation coil from the capacitive element, and which turns ON/OFF in phase with the first switching circuit; and
- a second high-voltage switching circuit that supplies the discharge current from the capacitive element to the other end of the excitation coil, and which turns ON/OFF in the opposite phase from the first switching circuit.

2. The excitation circuit as set forth in claim 1, wherein:

the first high-voltage switching circuit comprises:
- a first P-channel MOSFET wherein the source terminal is connected to a capacitive element, and the drain terminal is connected to one end of the excitation coil;
- a first resistive element that is connected between the gate terminal of the first P-channel MOSFET and the source terminal;
- a first constant voltage diode wherein the anode terminal is connected to the gate terminal of the first P-channel MOSFET and the cathode terminal is connected to the source terminal of the first P-channel MOSFET; and
- a first switching element that turns ON/OFF in phase with the first switching circuit, for turning ON/OFF the first P-channel MOSFET through controlling the gate terminal voltage of the first P-channel MOSFET through a second resistive element; and the second high-voltage switching circuit comprises:
- a second P-channel MOSFET wherein the source terminal is connected to a capacitive element, and the drain terminal is connected to the other end of the excitation coil;
- a third resistive element that is connected between the gate terminal of the second P-channel MOSFET and the source terminal;
- a second constant voltage diode wherein the anode terminal is connected to the gate terminal of the second P-channel MOSFET and the cathode terminal is connected to the source terminal of the second P-channel MOSFET; and
- a second switching element that turns ON/OFF in the opposite phase from the first switching circuit, for turning ON/OFF the second P-channel MOSFET through controlling the gate terminal voltage of the first P-channel MOSFET through a second resistive element.

3. An electromagnetic flow meter comprising the excitation circuit as set forth in claim 1.

* * * * *